April 19, 1938.  A. ROSCH  2,114,858

THROTTLE VALVE

Filed May 13, 1937

Inventor:
Arthur Rosch,
by Harry E. Dunham
His Attorney.

Patented Apr. 19, 1938

2,114,858

UNITED STATES PATENT OFFICE 2,114,858

THROTTLE VALVE

Arthur Rosch, Brieselang, near Nauen, Germany, assignor to General Electric Company, a corporation of New York Application May 13, 1937, Serial No. 142,453
In Germany August 12, 1936

2 Claims. (Cl. 251—27)

The present invention relates to throttle valves of the type which includes a valve casing with an inlet and an outlet and a disk member in cooperative relation with a valve seat formed on the casing. In the ordinary type of throttle valve heretofore used the throttling of elastic fluid flowing therethrough was effected at a single throttle point so that the velocity of flow, especially where high pressures had to be throttled, that is considerably decreased, effected powerful expansion noises, resulting in considerable vibration of the valve and the elements associated therewith.

The object of my invention is to provide an improved construction of throttle valves of the type above specified whereby the pressure reduction of elastic fluid may be accomplished in a single valve without causing unbearable noise and vibration thereof.

This is accomplished with my invention by the provision of a plurality of expansion chambers formed on one of the seat-forming casing and disk members so that the expansion of the elastic fluid may proceed in stages from compartment to compartment and the velocity of flow of such fluid is reduced at the individual throttle points. The noise produced during expansion is considerably reduced by shaping the movable valve member and the valve disk so that for any valve lift the velocity of flow is substantially the same at each throttle point.

For a better understanding of what I believe to be novel and my invention, attention is directed to the following description and the claims appended thereto in connection with the accompanying drawing.

Figure 1:
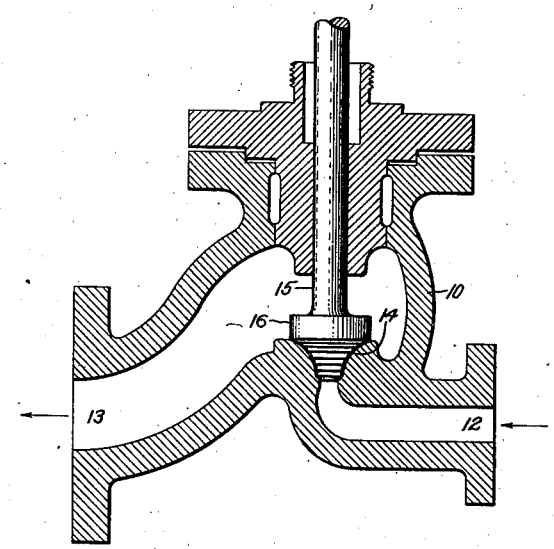
Figure 2:
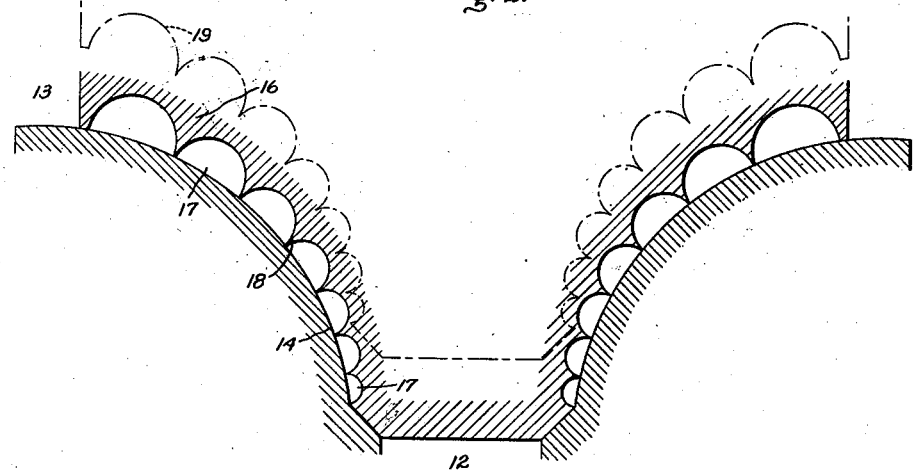

In the drawing, Fig. 1 is a sectional view of a throttle valve embodying my invention, and Fig. 2 represents an enlarged detail view of Fig. 1.

The arrangement comprises a casing member 10 which forms an inlet channel 12 and a discharge channel 13. The casing portion connecting the two channels 12 and 13 forms a valve seat 14 for a movable valve member with a stem 15 and a disk 16 in cooperative relation with the seat 14. The seat 14, as shown in Fig. 2, is conically shaped and has curved walls so that the space defined by the seat increases gradually in cross-section. The surface of the disk 16 is shaped to conform to the shape of the valve seat. In addition the outer surface of the disk 16 has a plurality of annular grooves 17, which grooves form expansion chambers increasing in volume from the inlet 12 towards the outlet 13. The disk portion intermediate adjacent grooves 17 form annular projections 18 which contact the valve seat 14 in closing position of the valve and in opening position effect throttling of elastic fluid flowing from the inlet 12 towards the outlet 13. The valve disk is indicated in Fig. 2 by dash-dotted lines 19 in opening position. The arrangement, as stated above, is such that throttling is effected in a plurality of steps or stages from the inlet channel 12 towards the outlet channel 13. Simultaneously with the throttling, the elastic fluid is permitted to expand whereby the velocity of the elastic fluid on its flow from the inlet 12 to the outlet 13, that is through the passage formed between the valve seat, and the valve disk, is maintained substantially constant and thus noise and vibration are substantially eliminated.

What I claim as new and desire to secure by Letters Patent of the United States is:—

1. Throttle valve having a casing with a conically shaped outwardly curved seat portion increasing gradually in cross-section from the inlet towards the outlet, and a single conically shaped valve disk conforming to the shape of the seat with a plurality of annular grooves forming expansion chambers increasing in cross-section from the inlet towards the outlet to produce successive expansion of the elastic fluid flowing therethrough without increasing the velocity of the fluid, the valve parts being so curved that the width of the outlet opening will be substantially equal to the axial movement of said valve disk.

2. Throttle valve having a casing with a conically shaped seat therein, said seat comprising an outwardly flaring curved portion and a flat tapered portion at the inlet edge thereof, a single conically shaped valve disk conforming to the shape of said seat portions, the curvature of said seat and disk being such that the width of the outlet opening will be substantially equal to the axial movement of said disk, said valve disk having a flat tapered face portion to cooperate with said flat tapered seat portion and a plurality of narrow annular faces on the curved portion thereof spaced progressively farther apart from said flat tapered portion toward the outlet edge of said disk defining therebetween and with the flaring seat portion a plurality of annular expansion chambers increasing gradually in cross-section from the inlet toward the outlet to produce successive expansion of the elastic fluid flowing therethrough without increasing the velocity of the fluid.

ARTHUR ROSCH.